(12) United States Patent
Bessho et al.

(10) Patent No.: US 11,537,790 B2
(45) Date of Patent: Dec. 27, 2022

(54) WORD VECTOR CHANGING DEVICE, METHOD, AND PROGRAM

(71) Applicant: NIPPON TELEGRAPH AND TELEPHONE CORPORATION, Tokyo (JP)

(72) Inventors: Katsuji Bessho, Tokyo (JP); Hisako Asano, Tokyo (JP); Junji Tomita, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 193 days.

(21) Appl. No.: 17/046,668

(22) PCT Filed: Apr. 4, 2019

(86) PCT No.: PCT/JP2019/015025
§ 371 (c)(1),
(2) Date: Oct. 9, 2020

(87) PCT Pub. No.: WO2019/198618
PCT Pub. Date: Oct. 17, 2019

(65) Prior Publication Data
US 2021/0034822 A1 Feb. 4, 2021

(30) Foreign Application Priority Data
Apr. 11, 2018 (JP) .............................. JP2018-076253

(51) Int. Cl.
*G06F 17/00* (2019.01)
*G06F 40/237* (2020.01)
(Continued)

(52) U.S. Cl.
CPC .......... *G06F 40/237* (2020.01); *G06F 40/242* (2020.01); *G06F 40/30* (2020.01)

(58) Field of Classification Search
None
See application file for complete search history.

(56) References Cited

U.S. PATENT DOCUMENTS

| | | | | |
|---|---|---|---|---|
| 11,023,685 | B2* | 6/2021 | Khosla | ..................... G06F 40/30 |
| 2013/0197900 | A1* | 8/2013 | Rotbart | ..................... G06F 40/40 704/9 |

(Continued)

OTHER PUBLICATIONS

Bessho, Katsuhito, et al., "A Method for Generating Corpus Concept Base Based on Co-occurrences between Words and Semantic Attributes," Information Processing Society of Japan Journal, vol. No. 49, 12, 3997-4006 (Dec. 2008).

(Continued)

*Primary Examiner* — Satwant K Singh (57) ABSTRACT

To arrange all words so that the distance of a given word pair will be appropriate.
Using as input a concept base 22 which is a set of pairs of a word and a vector representing a concept of the word, and a dictionary 24 which is a set of semantically distant or close word pairs, when a word pair C being a pair of given words A, B in the concept base 22 is present in the dictionary 24, conversion means 30 associates with the word pair C a magnitude D of a difference vector between a difference vector V' between a converted vector of the word A and a converted vector of the word B, and a vector kV determined by multiplying a difference vector V between the vector of the word A in the concept base 22 and the vector of the word B in the concept base 22 by a scalar value k. When the word pair C is not present in the dictionary 24, the conversion means 30 associates the magnitude D of the difference vector between the difference vector V' and the difference vector V with the word pair C. The conversion means 30 converts the vector of a given word in the concept base 22

(Continued)

such that a total sum of the magnitude D corresponding to every word pair C is minimized.

20 Claims, 3 Drawing Sheets

(51) Int. Cl.
*G06F 40/242* (2020.01)
*G06F 40/30* (2020.01)

(56) References Cited

U.S. PATENT DOCUMENTS

2017/0060854 A1* 3/2017 Zeng .................. G06F 40/30
2019/0197118 A1* 6/2019 Zeng .................. G06F 40/44

OTHER PUBLICATIONS

Mikolov, Tomas, et al., "Efficient Estimation of Word Representations in Vector Space," arXiv:1301.3781v3 [cs.CL] Sep. 7, 2013.

* cited by examiner

| Word | Word vector | | | |
|---|---|---|---|---|
| | 1 | 2 | .... | n |
| ringo (apple) | 0.01 | 0.05 | .... | 0.03 |
| mikan (orange) | 0.01 | 0.06 | .... | 0.02 |
| kokkai (national diet) | 0.09 | 0.01 | .... | 0.08 |
| naikaku (the Cabinet) | 0.08 | 0.02 | .... | 0.07 |
| .... | .... | .... | .... | .... |

Fig. 3

| Basis word | Antonyms |
|---|---|
| yoi (good) | warui (bad) |
| amai (sweet) | kibishii (exacting), shoppai (salty), suppai (sour), mazui (tasteless), sui (acetic) |
| aimai (ambiguous) | meikaku (clear), hanzen (manifest) |
| ... | ... |

Fig. 4

| Basis word | Co-hyponyms |
|---|---|
| yakyu (baseball) | sakka (soccer), ragubi (rugby), amefuto (American football), bare-boru (volley ball) |
| washoku (Japanese food) | yoshoku (western food), chuka (Chinese food) |
| eakon (air conditioner) | sentakuki (washing machine), reizoko (refrigerator), sojiki (vacuum cleaner) |
| ... | ... |

Fig. 5

| Basis word | Synonyms |
|---|---|
| yakyu | besuboru |
| daidokoro (kitchen) | chubo (kitchen), kittin (transliteration of "kitchen") |
| hon (book) | shomotsu (book), bukku (transliteration of "book") |
| ... | ... |

Fig. 6

WORD VECTOR CHANGING DEVICE, METHOD, AND PROGRAM

CROSS-REFERENCE TO RELATED APPLICATIONS

This application is a U.S. 371 Application of International Patent Application No. PCT/JP2019/015025, filed on 4 Apr. 2019, which application claims priority to and the benefit of JP Application No. 2018-076253, filed on 11 Apr. 2018, the disclosures of which are hereby incorporated herein by reference in their entireties.

TECHNICAL FIELD

The present invention relates to a word vector changing device, method and program that, given a set of pairs of a word and a vector representing a concept of the word, converts the vectors of words such that a distance between the vectors of words in a semantically distant word pair which is present in a dictionary becomes greater than before, that the distance between the vectors of words in a semantically close word pair present in the dictionary becomes smaller than before, and that the distance between the vectors of words in a word pair that is not present in the dictionary is changed as little as possible.

BACKGROUND ART

A concept base is a set of pairs of a word and a vector representing the concept of the word and approaches to it include ones described in Non-Patent Literatures 1 and 2.

These approaches both generate the vectors of words using a corpus as input, producing an arrangement in which the vectors of semantically close words lie close to each other. Their generation algorithms are based on a distribution hypothesis that the concept of a word can be estimated from an occurrence pattern of surrounding words around the word (marginal distribution) within a corpus.

Using a concept base generated by these approaches, a distance representing similarity between texts can be calculated. For a given text, a vector for the text is generated by combining the vectors of words in the text (e.g., by determining a barycenter of the word vectors). The distance between the corresponding text vectors is calculated as the distance between the texts.

CITATION LIST

Non-Patent Literature

Non-Patent Literature 1: Bessho Katsuji, Uchiyama Toshiro, Uchiyama Tadasu, Kataoka Ryoji and Oku Masahiro, "A Method for Generating Corpus-concept-base Based on Co-occurrences between Words and Semantic Attributes," Information Processing Society of Japan Transaction, Vol. 49, No. 12, pp.3997-4006, December 2008.

Non-Patent Literature 2: Tomas Mikolov, Kai Chen, Greg Corrado, Jeffrey Dean, "Efficient estimation of word representations in vector space,"ICLR, 2013.

SUMMARY OF THE INVENTION

Technical Problem

A concept base generated by the foregoing conventional approaches has the following issues.

Issue 1)

Since a pair of antonyms (e.g., yoi (good), warui (bad)) has similar marginal distributions for the respective words, it has an issue of the vectors of the words being close to each other. This leads to an inappropriate distance relationship between text vectors.

For example, with respect to the word "yoi (good)", its antonym "warui (bad)" will have a smaller vector-to-vector distance than a synonym "yoroshii (all right)". Consequently, for text A below, text B will have a smaller vector-to-vector distance than text C even though text C has a closer meaning to text A than text B does.

Text A: Kono kangae wa yoi (this idea is good).
Text B: Kono kangae wa warui (this idea is bad).
Text C: Kono kangae wa yoroshii (this idea is all right).

Issue 2)

For a pair of words, when one of the words is not a hypernym, a hyponym, or a synonym of the other and they have a common hypernym, the pair is called a pair of co-hyponyms. For a pair of words "yakyu (baseball), sakka (soccer)", either one of the words is not a hypernym, a hyponym, or a synonym of the other and they have a common hypernym "supotsu (sport)", so they constitute a pair of co-hyponyms.

Since a pair of co-hyponyms (e.g., yakyu (baseball), sakka (soccer)) has similar marginal distributions for the respective words, it has an issue of the vectors of the words being close to each other. This leads to an inappropriate distance relationship between text vectors.

For example, with respect to the word "yakyu (baseball)", a co-hyponym of it "sakka (soccer)" will have a smaller vector-to-vector distance than a hyponym "kusayakyu (sandlot baseball)". Consequently, for text A below, text B will have a smaller vector-to-vector distance than text C even though text C has a closer meaning to text A than text B does.

Text A: Yakyu wo miru (watch a baseball).
Text B: Sakka wo miru (watch a soccer).
Text C: Kusayakyu wo miru (watch a sandlot baseball).

Issue 3)

A pair of synonyms (e.g., yakyu, besuboru (transliteration of "baseball")) has the issue of the vectors of the words being distant from each other in some cases. This leads to an inappropriate distance relationship between text vectors.

For example, with respect to the word "yakyu (baseball)", a synonym of it "besuboru" will have a larger vector-to-vector distance than a hyponym "kusayakyu (sandlot baseball)". Consequently, for text A below, text C will have a smaller vector-to-vector distance than text B even though text B has a closer meaning to text A than text C does.

Text A: Yakyu wo miru (watch a baseball).
Text B: Besuboru wo miru (watch a besuboru).
Text C: Kusayakyu wo miru (watch a sandlot baseball).

The present invention seeks to solve these issues and makes an arrangement of word vectors reflect semantic closeness between words by converting the vectors of words in a once generated concept base. More specifically, it performs conversion such that the distance between the vectors of words in a semantically distant word pair which is present in a dictionary, such as antonyms and co-hyponyms, becomes greater than before, and that the distance between the vectors of words in a semantically close word pair present in the dictionary, such as synonyms, becomes smaller than before. However, performing only it results in an unreasonable increase or decrease in the distance between vectors for a word pair that is not present in the dictionary, making their arrangement inappropriate. Thus, it is necessary to convert the vectors of words so that a word pair present in the dictionary is given an appropriate distance, while at the same time so that the distance of a word pair that is not present in the dictionary is changed as little as possible. An object of the present invention is to arrange all words so that the distance of a given word pair will be appropriate.

Means for Solving the Problem

To attain the object, a word vector changing device according to the present invention includes: a concept base which is a set of pairs of a word and a vector representing a concept of the word; and a conversion means configured: with a dictionary which is a set of semantically distant or close word pairs as input, when a word pair C being a pair of given words A, B in the concept base is present in the dictionary, to associate with the word pair C a magnitude D of a difference vector between a difference vector V' between a converted vector of the word A and a converted vector of the word B, and a vector kV determined by multiplying a difference vector V between the vector of the word A in the concept base and the vector of the word B in the concept base by a scalar value k, when the word pair C is not present in the dictionary, to associate the magnitude D of the difference vector between the difference vector V' and the difference vector V with the word pair C, and to convert the vector of a given word in the concept base such that a total sum of the magnitude D corresponding to every word pair C is minimized.

The conversion means of the word vector changing device according to the present invention sets the scalar value k to a value equal to or greater than 1 when word pair C is a semantically distant word pair in the dictionary, and sets the scalar value k to a value equal to or greater than 0 and equal to or smaller than 1 when the word pair C is a semantically close word pair in the dictionary.

A word vector changing method according to the present invention is in a word vector conversion device including a concept base which is a set of pairs of a word and a vector representing a concept of the word, the method including, with a dictionary which is a set of semantically distant or close word pairs as input, when a word pair C being a pair of given words A, B in the concept base is present in the dictionary, associating, by conversion means, with the word pair C a magnitude D of a difference vector between a difference vector V' between a converted vector of the word A and a converted vector of the word B, and a vector kV determined by multiplying a difference vector V between the vector of the word A in the concept base and the vector of the word B in the concept base by a scalar value k, when the word pair C is not present in the dictionary, associating the magnitude D of the difference vector between the difference vector V' and the difference vector V with the word pair C, and converting the vector of a given word in the concept base such that a total sum of the magnitude D corresponding to every word pair C is minimized.

A program according to the present invention is a program for causing a computer to function as the conversion means of the word vector changing device according to the present invention.

Effects of the Invention

With the present invention, the difference vector V' after conversion is approximately equal to kV, which is k times the difference vector V before conversion. For a semantically distant word pair present in the dictionary such as antonyms and co-hyponyms, setting k to k>1 results in their vector-to-vector distance after conversion being greater than that before conversion. For a semantically close word pair present in the dictionary such as synonyms, setting k to k<1 results in their vector-to-vector distance after conversion being smaller than that before conversion. For a word pair that is not present in the dictionary, their vector-to-vector distance after conversion is changed little from that before conversion. In this manner, a converted concept base that achieves an arrangement of all the words with a given word pair having an appropriate distance can be generated.

A certain concept base has a property that the difference vectors between the vectors of words from word pairs that are in the same relationship are approximately the same. That is, when the vector of word x is represented as $U_x$, $$U_a - U_b \approx U_c - U_d \qquad \text{[Formula 1]}$$

holds for a word pair (a, b) and a word pair (c, d) which are in the same relationship. For example, a word pair (otoko (man), onnna (woman)) and a word pair (oji (uncle), oba (aunt)) are in the same relationship, where $$U_{otoko} - U_{onna} \approx U_{oji} - U_{oba} \qquad \text{[Formula 2]}$$

holds.

In the present invention, when the converted vector of word x is represented as $U_x'$, for a word pair (a, b) and a word pair (c, d) that are in the same relationship, $$U_a - U_b \approx U_c - U_d \qquad \text{[Formula 3]}$$

holds, while $$U_a' - U_b' \approx k(U_a - U_b), U_c' - U_d' \approx k(U_c - U_d) \qquad \text{[Formula 4]}$$

holds (where k depending on the word pair). For all of the word pairs that are in the same relationship, the magnitude of their corresponding difference vector before conversion are approximately the same. Then, all of the word pairs that are in the same relationship are either semantically distant, or semantically close, or nor semantically distant nor close. The value k is usually defined depending on the magnitude of the difference vector before conversion. Accordingly, the same value of k can be set for each one of word pairs that are in the same relationship. Thus, for a word pair (a, b) and a word pair (c, d) that are in the same relationship, $$U_a' - U_b' \approx U_c' - U_d' \qquad \text{[Formula 5]}$$

holds. Thus, the present invention also has the effect of being able to maintain the property that the difference vectors between the vectors of words from word pairs that are in the same relationship are approximately the same, as much as possible even after conversion.

Use of a converted concept base for the calculation of an inter-text distance provides a more appropriate distance relationship between text vectors.

In the case of Issue 1), for the word "yoi (good)", its antonym "warui (bad)" will have a greater vector-to-vector distance than a synonym "yoroshii (all right)", so text C will have a smaller vector-to-vector distance to text A than text B does.

In the case of Issue 2), for the word "yakyu (baseball)", a co-hyponym of it "sakka (soccer)" will have a greater vector-to-vector distance than a hyponym "kusayakyu (sandlot baseball)", so text C will have a smaller vector-to-vector distance to text A than text B does.

In the case of Issue 3), for the word "yakyu (baseball)", a synonym of it "besuboru (transliteration of "baseball")" will have a smaller vector-to-vector distance than a hyponym "kusayakyu (sandlot baseball)", so text B will have a smaller vector-to-vector distance to text A than text C does.

DESCRIPTION OF EMBODIMENTS

Embodiments of the present invention are described below in conjunction with the drawings.

<Configuration of a Word Vector Changing Device According to an Embodiment of the Present Invention>

Figure 1:
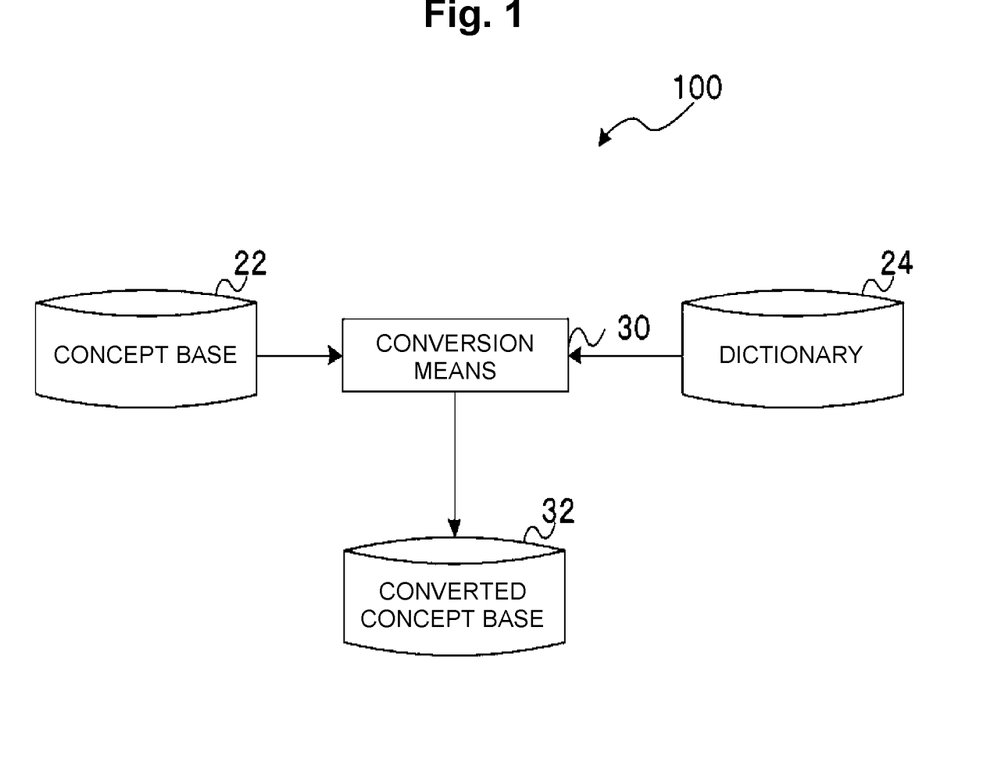
FIG. 1 is a block diagram showing a configuration of a word vector changing device 100 according to an embodiment of the present invention.

FIG. 1 shows an exemplary configuration of a word vector changing device according to claim 1 of the present invention.

The word vector changing device 100 includes a concept base 22 which is a set of pairs of a word and a vector representing a concept of the word, and conversion means 30 configured: with a dictionary 24 which is a set of semantically distant or close word pairs as input, when a word pair C being a pair of given words A, B in the concept base 22 is present in the dictionary 24, to associate with the word pair C a magnitude D of a difference vector between a difference vector V' between a converted vector of the word A and a converted vector of the word B, and a vector kV determined by multiplying a difference vector V between the vector of the word A in the concept base 22 and the vector of the word B in the concept base 22 by a scalar value k; when the word pair C is not present in the dictionary 24, to associate the magnitude D of the difference vector between the difference vector V' and the difference vector V with the word pair C; and to convert the vector of a given word in the concept base 22 such that a total sum of the magnitude D corresponding to every word pair C is minimized, and to generate a converted concept base 32.

Figure 2:
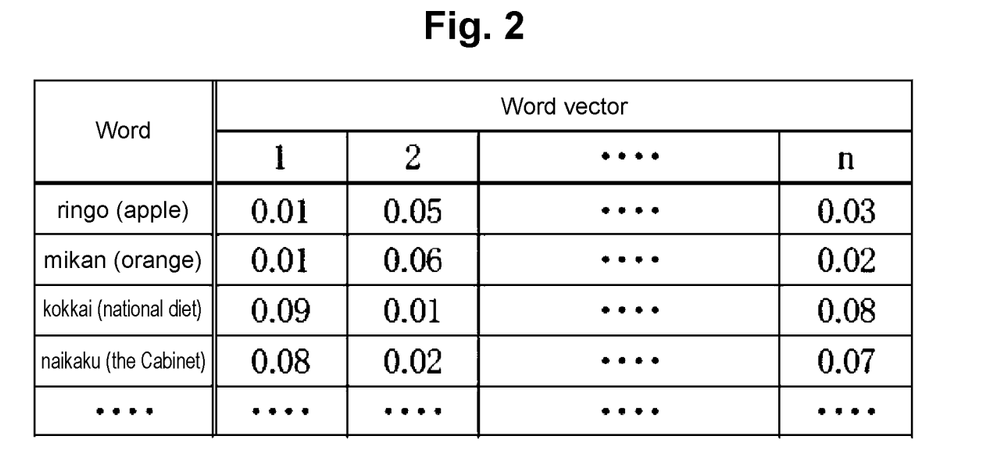
FIG. 2 shows an example of a concept base 22.

FIG. 2 is an example of the concept base 22. The concept base 22 is generated with the approach of Non-Patent Literature 1 or 2, for example.

None of the words in the concept base 22 overlap.

The vector of each word is an n-dimension vector and the vectors of semantically close words are arranged close to each other.

Only content words, such as nouns, verbs and adjectives, may be registered in the concept base 22. It is also possible to register words in the end-form (shushi-kei) in the concept base 22 and search the concept base 22 with the end-form of a word.

Figure 3:
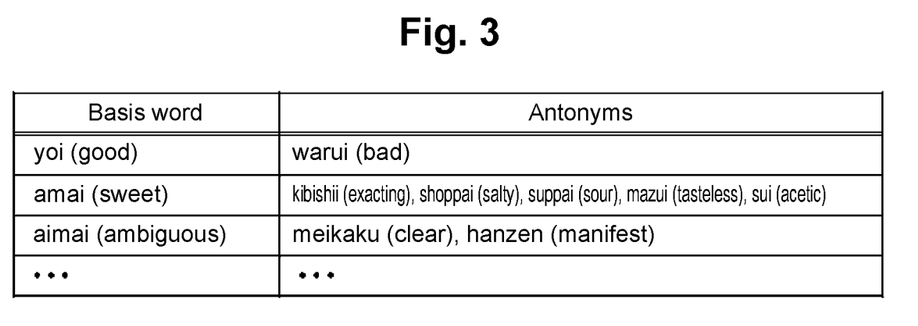
FIG. 3 is an example of records related to antonyms in a dictionary 24.
Figure 4:
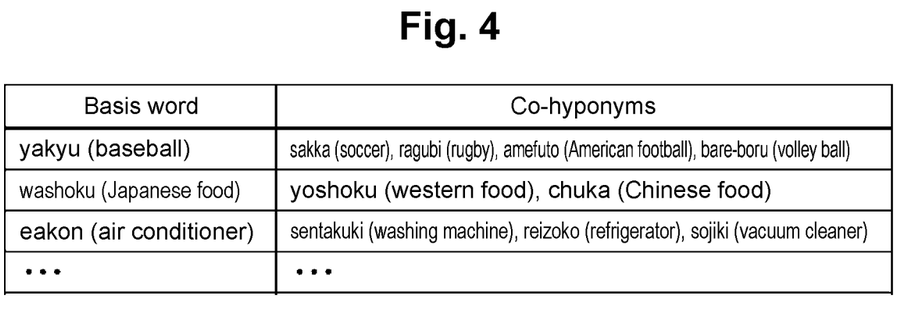
FIG. 4 is an example of records related to co-hyponyms in the dictionary 24.
Figure 5:
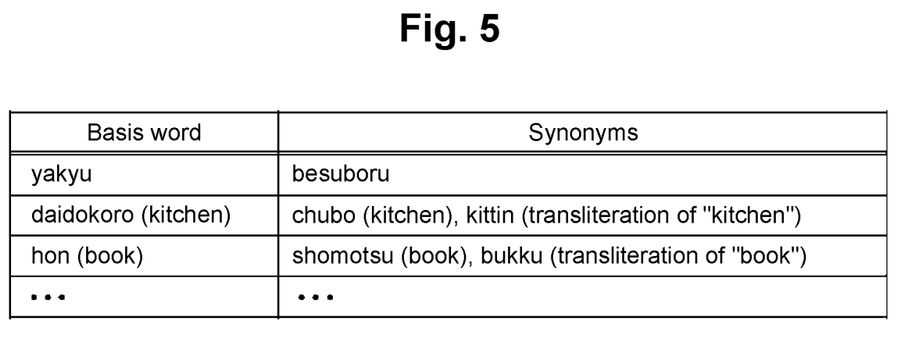
FIG. 5 is an example of records related to synonyms in the dictionary 24.

As an example of the dictionary 24, it can be configured such that records are divided into record groups related to antonyms, co-hyponyms, and synonyms, respectively. FIG. 3 is an example of records related to antonyms, FIG. 4 is an example of records related to co-hyponyms, and FIG. 5 is an example of records related to synonyms. Each record in FIG. 3 consists of a basis word and a list of antonyms for that basis word. A pair of a basis word and each of the antonyms in its antonym list constitutes a word pair of antonyms. The same applies to FIGS. 4 and 5. Word pairs in the antonym records and the co-hyponym records are semantically distant word pairs. Word pairs in the synonym records are semantically close word pairs.

The dictionary 24 is not limited to the example above, but may be formed from a group of records each consisting of a basis word and a list of semantically distant words for that basis word and a group of records each consisting of a basis word and a list of semantically close words for that basis word. In that case, a pair of a basis word and each word in its list of semantically distant words constitutes a semantically distant word pair, and a pair of a basis word and each word in its list of semantically close words constitutes a semantically close word pair.

The dictionary 24 is typically configured such that, in records of similar types (such as being semantically distant or semantically close) in the dictionary 24, when there is a record for basis word A that has word B in its word list, there will be a record for basis word B that has word A in its word list.

Conversion processing performed by the conversion means 30 is formulated as follows.

A list of words in the concept base 22 is defined as:

$$W_1, W_2, \ldots, W_m.\qquad\text{[Formula 6]}$$

A vector of $W_p$ in the concept base 22 is defined as:

$$\tau_p = (\tau_{p1}, \tau_{p2}, \ldots, \tau_{pn}).\qquad\text{[Formula 7]}$$

and a vector of $W_p$ in the converted concept base 32 is defined as:

$$\omega_p = (\omega_{p1}, \omega_{p2}, \ldots, \omega_{pn}).\qquad\text{[Formula 8]}$$

The value $\tau_{pq}$ is a constant and $\omega_{pq}$ is a variable.

For a word pair $W_i, W_j$ in the concept base 22, a scalar value k by which a difference vector $\tau_i - \tau_j$ between $\tau_i$ and $\tau_j$ is multiplied generally depends on $\{i,j\}$ and is represented as $k_{\{i,j\}}$.

The conversion means 30 determines $(\omega_{pq})$ that minimizes the objective function F below.

$$\|\bigcirc\|\qquad\text{[Formula 9]}$$

represents L2 norm.

[Formula 10]

$$\begin{aligned}F &= \sum_{\{(i,j)\in\{(i,j)|1\le i<j\le m\}\}} F_{\{i,j\}} \\ &= \sum_{\{(i,j)\in\{(i,j)|1\le i<j\le m\}\}} \|(\omega_i - \omega_j) - k_{\{i,j\}}(\tau_i - \tau_j)\| \\ &= \sum_{\{(i,j)\in\{(i,j)|1\le i<j\le m\}\}} \|(\omega_{i1} - \omega_{j1}, \omega_{i2} - \omega_{j2}, \ldots \omega_{in} - \omega_{jn}) - \\ &\qquad k_{\{i,j\}}(\tau_{i1} - \tau_{j1}, \tau_{i2} - \tau_{j2}, \ldots \tau_{in} - \tau_{jn})\| \\ &= \sum_{\{(i,j)\in\{(i,j)|1\le i<j\le m\}\}} \|(\omega_{i1} - \omega_{j1} - k_{\{i,j\}}(\tau_{i1} - \tau_{j1}), \omega_{i2} - \omega_{j2} - \\ &\qquad k_{\{i,j\}}(\tau_{i2} - \tau_{j2}), \ldots \omega_{in} - \omega_{jn} - k_{\{i,j\}}(\tau_{in} - \tau_{jn}))\| \\ &= \sum_{\{(i,j)\in\{(i,j)|1\le i<j\le m\}\}} \left(\sum_{1\le t\le n}(\omega_{it} - \omega_{jt} - k_{\{i,j\}}(\tau_{it} - \tau_{jt}))^2\right)^{\frac{1}{2}}\end{aligned}\qquad\text{(Formula 1)}$$

Alternatively, $(\omega_{pq})$ that minimizes the following objective function F is determined.

[Formula 11]

$$F = \sum_{\{i,j\} \in \{\{i,j\} | 1 \leq i < j \leq m\}} F_{\{i,j\}} \quad \text{(Formula 2)}$$

$$= \sum_{\{i,j\} \in \{\{i,j\} | 1 \leq i < j \leq m\}} \|(\omega_i - \omega_j) - k_{\{i,j\}}(\tau_i - \tau_j)\|^2$$

$$= \sum_{\{i,j\} \in \{\{i,j\} | 1 \leq i < j \leq m\}} \left( \sum_{1 \leq t \leq n} (\omega_{it} - \omega_{jt} - k_{\{i,j\}}(\tau_{it} - \tau_{jt}))^2 \right)$$

Alternatively, $F_{(i,j)}$ is set as some other magnitude of:

$(\omega_i - \omega_j) - k_{\{i,j\}}(\tau_i - \tau_j)$      [Formula 12], and $(\omega_{pq})$ that minimizes the objective function F which is the total sum of $F_{(i,j)}$ is determined.

The value $k_{\{i,j\}}$ is set as follows.

The value $k_{\{i,j\}}$ is defined as $k_{\{i,j\}} \geq 1$ when the word pair $W_i, W_j$ is a semantically distant word pair in the dictionary 24, is defined as $0 \leq k_{\{i,j\}} \leq 1$ when the word pair $W_i, W_j$ is a semantically close word pair in the dictionary 24, and is defined as $k_{\{i,j\}} = 1$ when the word pair $W_i, W_j$ is not present in the dictionary 24. While it is defined as $k_{\{i,j\}} \geq 1$ when the word pair $W_i, W_j$ is a semantically distant word pair in the dictionary 24, it may be $k_{\{i,j\}} > 1$ instead. Likewise, while it is defined as $0 \leq k_{\{i,j\}} \leq 1$ when the word pair $W_i, W_j$ is a semantically close word pair in the dictionary 24, it may be $0 \leq k_{\{i,j\}} \leq 1$ instead.

When the word pair $W_i, W_j$ is a semantically distant word pair in the dictionary 24, $k_{\{i,j\}}$ may be a constant that does not depend on $\{i,j\}$. It is also possible to define a constant $\alpha > 0$, with $k_{\{i,j\}} = (\|\tau_i - \tau_j\| + \alpha)/\|\tau_i - \tau_j\|$.      [Formula 13]

It is also possible to define a constant $\beta$ greater than the maximum of:

$\|\tau_i - \tau_j\|$      [Formula 14]

with $k_{\{i,j\}} = \beta / \|\tau_i - \tau_j\|$.      [Formula 15]

It is also possible to make $k_{\{i,j\}}$ smaller as $\|\tau_i - \tau_j\|$      [Formula 16]

is greater so that the converted distance is prevented from being too large for a word pair originally having a large distance.

When the word pair $W_i, W_j$ is a semantically close word pair in the dictionary 24, $k_{\{i,j\}}$ may be a constant that does not depend on $\{i,j\}$. It is also possible to define a constant $\alpha > 0$, and when $\|\tau_i - \tau_j\| \geq \alpha$      [Formula 17]

then $k_{\{i,j\}} = (\|\tau_i - \tau_j\| - \alpha)/\|\tau_i - \tau_j\|$,      [Formula 18]

and when $\|\tau_i - \tau_j\| < \alpha$      [Formula 19]

then $k_{\{i,j\}} = 0$      [Formula 20]

It is also possible to define a constant $\beta \geq 0$ equal to or smaller than the minimum of:

$\|\tau_i - \tau_j\|$,      [Formula 21]

with $k_{\{i,j\}} = \beta / \|\tau_i - \tau_j\|$.      [Formula 22]

It is also possible to make $k_{\{i,j\}}$ greater as $\|\tau_i - \tau_j\|$      [Formula 23]

is smaller so that the converted distance is prevented from being too small for a word pair originally having a small distance.

The value $(\omega_{pq})$ that minimizes the objective function F is determined with stochastic gradient descendant, for example. (Other optimization approaches may be used.) The stochastic gradient descendant employs the algorithm:

while until coverged or repeated a predetermined number      [Formula 24]

of times do for each $\{i, j\} \in \{\{i, j\} \mid 1 \leq i < j \leq m\}$ do $$\omega_{pq} := \omega_{pq} - \eta \cdot \frac{\partial F_{\{i,j\}}}{\partial \omega_{pq}} \text{ for } 1 \leq p \leq m, 1 \leq q \leq n$$

An update portion of (m,n) matrix $(\omega_{pq})$ in the above algorithm is performed in the following manner by Adagrad, for example.

Before starting the algorithm, an initial value of the matrix $(\omega_{pq})$ is set for example as:

$\omega_{pq} := \tau_{pq}$.      [Formula 25]

A (m,n) matrix $(r_{pq})$ is determined. Before starting the algorithm, an initial value of the matrix $(r_{pq})$ is set for example as:

$r_{pq} := \varepsilon$ (a constant)      [Formula 26]

In the updated portion of the (m,n) matrix $(\omega_{pq})$ in the above algorithm, for given $1 \leq p \leq m, 1 \leq q \leq n$      [Formula 27]

an update is made as:

$$r_{pq} := r_{pq} + \frac{\partial F_{\{i,j\}}}{\partial \omega_{pq}} \cdot \frac{\partial F_{\{i,j\}}}{\partial \omega_{pq}} \quad \text{[Formula 28]}$$

$$\omega_{pq} := \omega_{pq} - \frac{\eta_0}{\sqrt{r_{pq}}} \cdot \frac{\partial F_{\{i,j\}}}{\partial \omega_{pq}}$$

This update will be called update (1).

When the objective function F is Formula 1, calculation of:

$$\frac{\partial F_{\{i,j\}}}{\partial \omega_{pq}} \quad \text{[Formula 29]}$$

is done as follows.

1.1) When $p = i$ and $F_{\{i,j\}} \neq 0$, $$\frac{\partial F_{\{i,j\}}}{\partial \omega_{iq}} = \frac{1}{2} \left( \sum_{1 \leq t \leq n} (\omega_{it} - \omega_{jt} - k_{\{i,j\}}(\tau_{it} - \tau_{jt}))^2 \right)^{-\frac{1}{2}} \cdot \quad \text{[Formula 30]}$$

$$2(\omega_{iq} - \omega_{jq} - k_{\{i,j\}}(\tau_{iq} - \tau_{jq}))$$

$$= \frac{1}{F_{\{i,j\}}} (\omega_{iq} - \omega_{jq} - k_{\{i,j\}}(\tau_{iq} - \tau_{jq}))$$

1.2) When $p = j$ and $F_{\{i,j\}} \neq 0$, $$\frac{\partial F_{\{i,j\}}}{\partial \omega_{jq}} = \frac{1}{2}\left(\sum_{1\le t\le n}(\omega_{it}-\omega_{jt}-k_{\{i,j\}}(\tau_{it}-\tau_{jt}))^2\right)^{-\frac{1}{2}} \quad \text{[Formula 31]}$$
$$2(\omega_{iq}-\omega_{jq}-k_{\{i,j\}}(\tau_{iq}-\tau_{jq}))(-1)$$
$$= -\frac{1}{F_{\{i,j\}}}(\omega_{iq}-\omega_{jq}-k_{\{i,j\}}(\tau_{iq}-\tau_{jq}))$$

1.3) Otherwise, $$\frac{\partial F_{\{i,j\}}}{\partial \omega_{pq}} = 0 \quad \text{[Formula 32]}$$

When the objective function F is Formula 2, calculation of:

$$\frac{\partial F_{\{i,j\}}}{\partial \omega_{pq}} \quad \text{[Formula 33]}$$

is done as follows.

2.1) When p=i $$\frac{\partial F_{\{i,j\}}}{\partial \omega_{iq}} = 2(\omega_{iq}-\omega_{jq}-k_{\{i,j\}}(\tau_{iq}-\tau_{jq})) \quad \text{[Formula 34]}$$

2.2) When p=j, $$\frac{\partial F_{\{i,j\}}}{\partial \omega_{jq}} = -2(\omega_{iq}-\omega_{jq}-k_{\{i,j\}}(\tau_{iq}-\tau_{jq})) \quad \text{[Formula 35]}$$

2.3) Otherwise, $$\frac{\partial F_{\{i,j\}}}{\partial \omega_{pq}} = 0 \quad \text{[Formula 36]}$$

<Effects of the Word Vector Changing Device According to Embodiments of the Present Invention>

Figure 6:
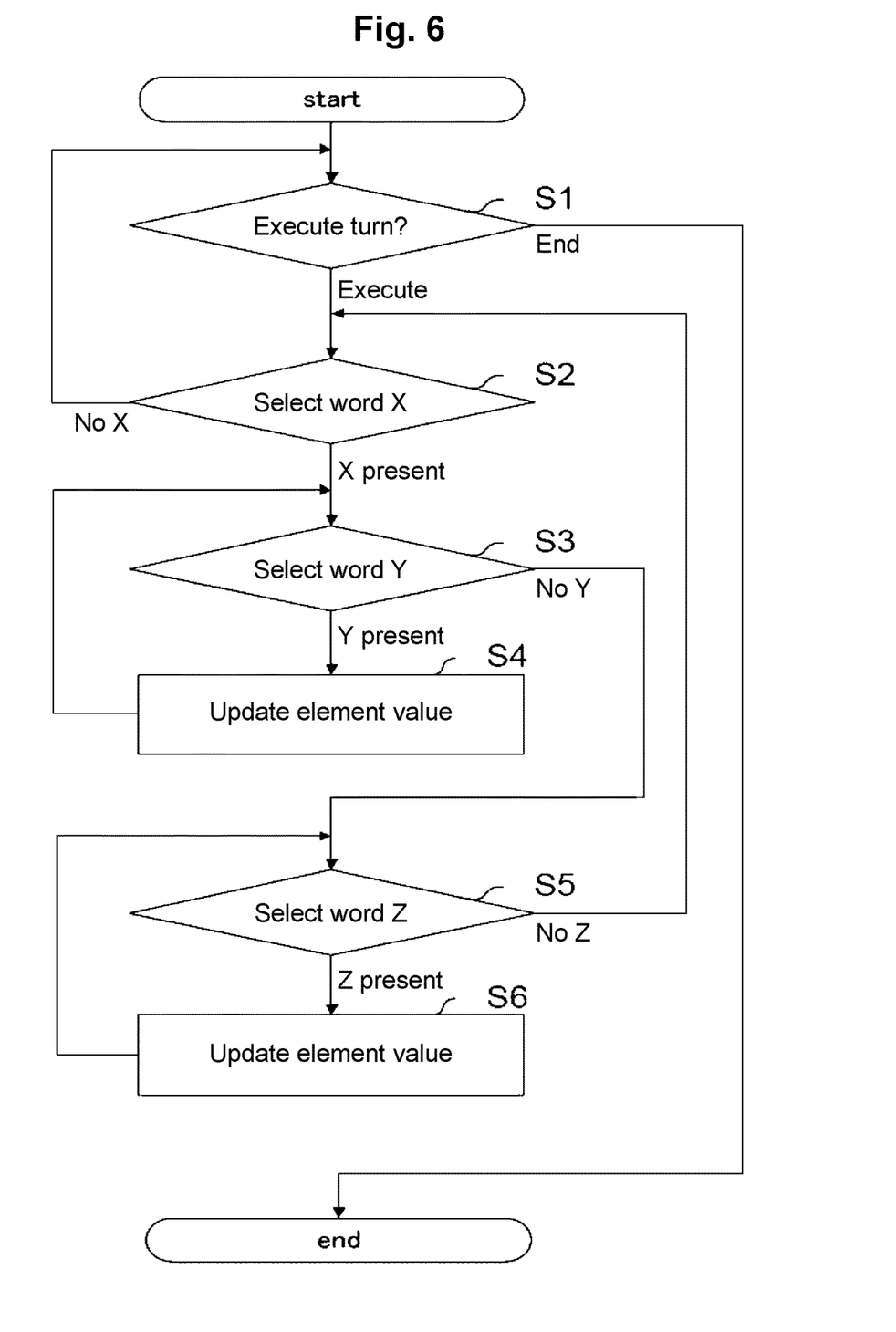
FIG. 6 is a flowchart illustrating an example of a conversion processing routine for the word vector changing device 100 according to an embodiment of the present invention.

FIG. 6 shows an example of a conversion processing routine for the conversion means 30. In the following, processing operations at the respective steps of FIG. 6 are shown.

S1)

It is determined whether to execute a turn consisting of processing at S2 to S6.

When the turn has been executed a predetermined number of times, it is determined to end and the conversion processing routine is terminated.

When the turn has not been executed the predetermined number of times, it is determined to execute it and the flow proceeds to S2.

Even when the turn has not been executed the predetermined number of times, if the present matrix $(\omega_{pq})$ is the same as the matrix $(\omega_{pq})$ at the immediately preceding S1 (i.e., it has converged), it may be determined to end and the conversion processing routine may be terminated.

When the conversion processing routine is terminated, a set of pairs of each word $W_p$ and its word vector $\omega_p$ in the concept base 22 is output as the converted concept base 32.

S2)

A list of words in the concept base 22 is represented as $W_1, W_2, \ldots, W_m$. One word $W_x$ selected from ones of $W_1, W_2, \ldots, W_m$ that are not selected yet at S2 is set as a target word X, and then the flow proceeds to S3. If there is no unselected word, the current turn is terminated and the flow proceeds to S1.

S3)

In a corresponding word list(s) in a record (or possibly multiple records) in the dictionary 24 for which $W_x$ is the basis word, one word $W_y$ is selected from those words that are present in the concept base 22, that are not selected yet at S3, and that satisfy a condition that a pair (as a set) of itself and the word $W_x$ is not a pair (as a set) that has been subjected to processing at S4 or S6 of the current turn, and $W_y$ is set as target word Y, after which the flow proceeds to S4. If there is no such a word, the flow proceeds to S5.

S4)

Setting i=x, j=y when x<y, and i=y, j=x when y<x, the update (1) is performed on {i,j}. In doing so, $$\|\tau_i-\tau_j\| \quad \text{[Formula 37]}$$

may be determined, and based on $$\|\tau_i-\tau_j\|, \quad \text{[Formula 38]}$$

an appropriate $k_{\{i,j\}}$ may be determined, after which the update (1) may be performed. The flow then proceeds to S3.

S5)

Among $W_1, W_2, \ldots, W_m$, one word $W_z$ is selected from those words that are not $W_x$, that are not any $W_y$ that was selected at S3, that are not selected yet at S5, and that satisfy a condition that a pair (as a set) of itself and $W_x$ is not a pair (as a set) that has been subjected to processing at S4 or S6 of the current turn, and $W_z$ is set as target word Z, after which the flow proceeds to S6. If there is no such a word, the flow proceeds to S2.

In order to reduce the computational complexity of S6, $W_1, W_2, \ldots, W_m$ excluding $W_x$ may be sorted in ascending order of their distance to $W_x$ at the start of the conversion processing routine, and a word that satisfies the above condition may be selected from among the top G words (in the order of sorting in some cases). As another alternative, among $W_1, W_2, \ldots, W_m$ excluding $W_x$, a word that satisfies the above condition may be selected from those words whose distance to $W_x$ is equal to or smaller than (or less than) a threshold (in some cases, in the ascending order of distance as sorted).

S6)

Setting i=x, j=z when x<z, and i=z, j=x when z<x, the update (1) is performed on {i,j}. The flow proceeds to S5.

Before performing the conversion processing routine, it is also possible to determine, for each $W_x$ selected at S2, a list of a pair of $W_y$ to be selected at S3 and a distance:

$$\|\tau_x-\tau_y\|, \quad \text{[Formula 39]}$$

or a pair of $W_z$ to be selected at S5 and a distance:

$$\|\tau_x-\tau_z\|, \quad \text{[Formula 40]}$$

and based on the distance $$\|\tau_x-\tau_y\|, \quad \text{[Formula 41]}$$

to determine the scalar value k corresponding to each word pair $(W_x, W_y)$. Then, in the conversion processing routine, selections at S3 and S5 may be made in accordance with the orders in the list and reference may be made to the previously determined scalar value k instead of calculating it.

The processing described thus far can be constructed into a program, which can be installed from a communications line or a recording medium and implemented by means such as a CPU.

It is noted that the present invention is not limited to the above embodiments but various modifications and applications thereof are possible within the scope of the claims.

INDUSTRIAL APPLICABILITY

The present invention is applicable to a word vector changing technique for, given a set of pairs of a word and a vector representing the concept of the word, converting the vectors of the words so that the distance of a given word pair will be appropriate.

REFERENCE SIGNS LIST 22 concept base
24 dictionary
30 conversion means
32 converted concept base
100 word vector changing device

The invention claimed is:

1. A computer-implemented method for processing aspects of words, the method comprising:
   receiving, from a concept base, a first concept of a first word, wherein the first concept includes a first pair of the first word and a first vector representation of the first word;
   receiving, from the concept base, a second concept of a second word, wherein the second concept includes a second pair of the second word and the second vector representation of the second word, wherein the second word and the first word are distinct;
   receiving, from a dictionary of words, a pair of words, wherein the pair of words represents a relationship between one word and the other word based on a semantic distance, wherein the semantic distance relates to a semantic relationship based on one of: synonyms, antonyms, or co-hyponyms;
   generating a first difference vector, wherein the first difference vector is a difference between the first vector representation of the first concept of the first word and the second vector representation of the second concept of the second word;
   when the pair of words matches the first word and the second word:
      determining, based on the pair of words, a coefficient value; and
      generating, based on a difference between the first vector representation and the second vector representation, a second difference vector, wherein a product of the second difference vector and the coefficient value differs from the first difference vector by a difference value;
   when the pair of words does not match the first word or the second word:
      generating, based on the difference between the first vector representation and the second vector representation, the second difference vector, wherein the second difference vector differs from the first difference vector by the difference value;
   converting, the first vector representation and the second vector representation, wherein the conversion relates to minimizing a total sum of the difference value corresponding to each occurrence of the pair of words in the dictionary; and
   updating, based on the converted first vector representation and the second vector representation, the first concept and the second concept in the concept base.

2. The computer-implemented method of claim 1, the method further comprising:
   when the pair of words is a pair of antonyms in the dictionary, determining the co-efficient value, wherein the co-efficient value is equal to or greater than 1.

3. The computer-implemented method of claim 1, the method further comprising:
   when the pair of words is a pair of synonyms in the dictionary, determining the co-efficient value, wherein the co-efficient value is greater than zero and less than 1.

4. The computer-implemented method of claim 1, the method further comprising:
   when the pair of words is a pair of co-hyponyms in the dictionary, determining the co-efficient value, wherein the co-efficient value is equal to or greater than 1.

5. The computer-implemented method of claim 1, wherein minimizing the total sum of the difference value relates to an optimization based on a stochastic gradient descendant.

6. The computer-implemented method of claim 1, wherein the first vector representation of the first word includes a multi-dimensional vector.

7. The computer-implemented method of claim 1, wherein the concept base includes words that are distinct to one another.

8. A system for processing aspects of words, the system comprises:
   a processor; and
   a memory storing computer-executable instructions that when executed by the processor cause the system to:
      receive, from a concept base, a first concept of a first word, wherein the first concept includes a first pair of the first word and a first vector representation of the first word;
      receive, from the concept base, a second concept of a second word, wherein the second concept includes a second pair of the second word and the second vector representation of the second word, wherein the second word and the first word are distinct;
      receive, from a dictionary of words, a pair of words, wherein the pair of words represents a relationship between one word and the other word based on a semantic distance, wherein the semantic distance relates to a semantic relationship based on one of: synonyms, antonyms, or co-hyponyms;
      generate a first difference vector, wherein the first difference vector is a difference between the first vector representation of the first concept of the first word and the second vector representation of the second concept of the second word;
      when the pair of words matches the first word and the second word:
         determine, based on the pair of words, a coefficient value; and
         determine, based on a difference between the first vector representation and the second vector representation, a second difference vector, wherein a product of the second difference vector and the coefficient value differs from the first difference vector by a difference value;

when the pair of words does not match the first word or the second word:
  determine, based on the difference between the first vector representation and the second vector representation, the second difference vector, wherein the second difference vector differs from the first difference vector by the difference value;
convert, the first vector representation and the second vector representation, wherein the conversion relates to minimizing a total sum of the difference value corresponding to each occurrence of the pair of words in the dictionary; and
update, based on the converted first vector representation and the second vector representation, the first concept and the second concept in the concept base.

9. The system of claim 8, the computer-executable instructions when executed further causing the system to:
  when the pair of words is a pair of antonyms in the dictionary, determine the co-efficient value, wherein the co-efficient value is equal to or greater than 1.

10. The system of claim 8, the computer-executable instructions when executed further causing the system to:
  when the pair of words is a pair of synonyms in the dictionary, determine the co-efficient value, wherein the co-efficient value is greater than zero and less than 1.

11. The system of claim 8, the computer-executable instructions when executed further causing the system to:
  when the pair of words is a pair of co-hyponyms in the dictionary, determine the co-efficient value, wherein the co-efficient value is equal to or greater than 1.

12. The system of claim 8, wherein minimizing the total sum of the difference value relates to an optimization based on a stochastic gradient descendant.

13. The system of claim 8, wherein the first vector representation of the first word includes a multi-dimensional vector.

14. The system of claim 8, wherein the concept base includes words that are distinct to one another.

15. A computer-readable non-transitory recording medium storing computer-executable instructions that when executed by a processor cause a computer system to:
  receive, from a concept base, a first concept of a first word, wherein the first concept includes a first pair of the first word and a first vector representation of the first word;
  receive, from the concept base, a second concept of a second word, wherein the second concept includes a second pair of the second word and the second vector representation of the second word, wherein the second word and the first word are distinct;
  receive, from a dictionary of words, a pair of words, wherein the pair of words represents a relationship between one word and the other word based on a semantic distance, wherein the semantic distance relates to a semantic relationship based on one of: synonyms, antonyms, or co-hyponyms;
  generate a first difference vector, wherein the first difference vector is a difference between the first vector representation of the first concept of the first word and the second vector representation of the second concept of the second word;
  when the pair of words matches the first word and the second word:
    determine, based on the pair of words, a coefficient value; and
    determine, based on a difference between the first vector representation and the second vector representation, a second difference vector, wherein a product of the second difference vector and the coefficient value differs from the first difference vector by a difference value;
  when the pair of words does not match the first word or the second word:
    determine, based on the difference between the first vector representation and the second vector representation, the second difference vector, wherein the second difference vector differs from the first difference vector by the difference value;
  convert, the first vector representation and the second vector representation, wherein the conversion relates to minimizing a total sum of the difference value corresponding to each occurrence of the pair of words in the dictionary; and
  update, based on the converted first vector representation and the second vector representation, the first concept and the second concept in the concept base.

16. The computer-readable non-transitory recording medium of claim 15, the computer-executable instructions when executed further causing the system to:
  when the pair of words is a pair of antonyms in the dictionary, determine the co-efficient value, wherein the co-efficient value is equal to or greater than 1.

17. The computer-readable non-transitory recording medium of claim 15, the computer-executable instructions when executed further causing the system to:
  when the pair of words is a pair of synonyms in the dictionary, determine the co-efficient value, wherein the co-efficient value is greater than zero and less than 1.

18. The computer-readable non-transitory recording medium of claim 15, the computer-executable instructions when executed further causing the system to:
  when the pair of words is a pair of co-hyponyms in the dictionary, determine the co-efficient value, wherein the co-efficient value is equal to or greater than 1.

19. The computer-readable non-transitory recording medium of claim 15, wherein minimizing the total sum of the difference value relates to an optimization based on a stochastic gradient descendant.

20. The computer-readable non-transitory recording medium of claim 15, wherein the first vector representation of the first word includes a multi-dimensional vector.

* * * * *